US009582076B2

(12) United States Patent
Kienzle et al.

(10) Patent No.: US 9,582,076 B2
(45) Date of Patent: Feb. 28, 2017

(54) SMART RING

(71) Applicant: Microsoft Corporation, Redmond, WA (US)

(72) Inventors: Wolf Kienzle, Bellevue, WA (US); Kenneth P. Hinckley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/489,385

(22) Filed: Sep. 17, 2014

(65) Prior Publication Data
US 2016/0077587 A1 Mar. 17, 2016

(51) Int. Cl.
G06F 3/00 (2006.01)
G06F 3/01 (2006.01)
G06F 3/0484 (2013.01)
G06F 3/0346 (2013.01)
G06F 3/033 (2013.01)
G06F 3/038 (2013.01)

(52) U.S. Cl.
CPC ............ G06F 3/014 (2013.01); G06F 3/017 (2013.01); G06F 3/033 (2013.01); G06F 3/0346 (2013.01); G06F 3/0383 (2013.01); G06F 3/0484 (2013.01); G06F 2203/0331 (2013.01)

(58) Field of Classification Search
USPC .......................................... 345/156; 235/380
See application file for complete search history.

(56) References Cited

U.S. PATENT DOCUMENTS

| 6,861,945 | B2 * | 3/2005 | Kim et al. ................. 340/407.1 |
| 6,882,128 | B1 | 4/2005 | Rahmel et al. |
| 7,268,517 | B2 | 9/2007 | Rahmel et al. |
| 7,702,282 | B2 | 4/2010 | Sandegard |
| 8,033,916 | B2 | 10/2011 | Caldwell et al. |
| 8,106,749 | B2 | 1/2012 | Ina et al. |
| 8,112,066 | B2 | 2/2012 | Ben Ayed |
| 8,179,604 | B1 | 5/2012 | Prada Gomez et al. |
| 8,292,833 | B2 | 10/2012 | Son et al. |

(Continued)

FOREIGN PATENT DOCUMENTS

| EP | 1785808 A1 | 5/2007 |
| EP | 2302882 A1 | 3/2011 |
| WO | 2011/055326 A1 | 5/2011 |

OTHER PUBLICATIONS

Zhang, et al., "A Ring-shaped Interactive Device for Large Remote Display and Mobile Device Control", In Proceedings of the 13th international conference on Ubiquitous computing, Sep. 17, 2011, pp. 473-474.

(Continued)

Primary Examiner — Christle I Marshall
(74) Attorney, Agent, or Firm — Brandon Roper; Judy Yee; Micky Minhas

(57) ABSTRACT

The description relates to a smart ring. In one example, the smart ring can be configured to be worn on a first segment of a finger of a user. The example smart ring can include at least one flexion sensor secured to the smart ring in a manner that can detect a distance between the at least one flexion sensor and a second segment of the finger. The example smart ring can also include an input component configured to analyze signals from the at least one flexion sensor to detect a pose of the finger.

20 Claims, 9 Drawing Sheets

(56) References Cited

U.S. PATENT DOCUMENTS

| | | | |
|---|---|---|---|
| 8,405,612 B2 | 3/2013 | Kruse et al. | |
| 8,447,704 B2 | 5/2013 | Tan et al. | |
| 8,478,195 B1 | 7/2013 | Hewinson | |
| 8,478,196 B1 | 7/2013 | Hewinson | |
| 8,500,031 B2 | 8/2013 | Naelon | |
| 8,526,880 B2 | 9/2013 | Foster | |
| 8,559,987 B1 | 10/2013 | Fisher | |
| 8,572,764 B2 | 11/2013 | Thellmann | |
| 8,615,374 B1 | 12/2013 | Discenzo | |
| 8,742,623 B1 | 6/2014 | Biederman et al. | |
| 8,820,649 B2 | 9/2014 | Goldman et al. | |
| 8,879,986 B2 | 11/2014 | Fisher | |
| 8,910,879 B2 | 12/2014 | Goldman et al. | |
| 9,232,331 B2 | 1/2016 | Priyantha et al. | |
| 9,360,946 B2 | 6/2016 | Priyantha et al. | |
| 2003/0142065 A1* | 7/2003 | Pahlavan | 345/156 |
| 2003/0214481 A1 | 11/2003 | Xiong | |
| 2004/0012559 A1 | 1/2004 | Seki et al. | |
| 2004/0032346 A1 | 2/2004 | Kim et al. | |
| 2005/0186994 A1 | 8/2005 | Rahmel et al. | |
| 2006/0001646 A1 | 1/2006 | Hai | |
| 2008/0014989 A1 | 1/2008 | Sandegard et al. | |
| 2009/0058830 A1 | 3/2009 | Herz | |
| 2009/0096746 A1* | 4/2009 | Kruse | G06F 3/014 345/156 |
| 2009/0278798 A1 | 11/2009 | Kim et al. | |
| 2009/0295758 A1 | 12/2009 | Lee et al. | |
| 2010/0007511 A1 | 1/2010 | Ina et al. | |
| 2010/0030695 A1 | 2/2010 | Chen | |
| 2010/0302137 A1 | 12/2010 | Benko et al. | |
| 2011/0007035 A1* | 1/2011 | Shai | 345/179 |
| 2011/0212687 A1 | 9/2011 | Foster | |
| 2011/0260839 A1 | 10/2011 | Cook et al. | |
| 2011/0313922 A1 | 12/2011 | Ben Ayed | |
| 2012/0024947 A1 | 2/2012 | Naelon | |
| 2012/0038652 A1 | 2/2012 | Yang | |
| 2012/0075173 A1* | 3/2012 | Ashbrook et al. | 345/156 |
| 2012/0083205 A1 | 4/2012 | Marcu et al. | |
| 2012/0139708 A1 | 6/2012 | Paradiso et al. | |
| 2012/0178365 A1 | 7/2012 | Katz | |
| 2012/0206485 A1 | 8/2012 | Osterhout et al. | |
| 2012/0256860 A1 | 10/2012 | Justice | |
| 2012/0309354 A1 | 12/2012 | Du | |
| 2012/0315843 A1 | 12/2012 | Cox | |
| 2013/0005241 A1 | 1/2013 | Ochikubo | |
| 2013/0022214 A1 | 1/2013 | Dickins et al. | |
| 2013/0027341 A1 | 1/2013 | Mastandrea | |
| 2013/0050087 A1 | 2/2013 | Tien et al. | |
| 2013/0100044 A1 | 4/2013 | Zhao et al. | |
| 2013/0127980 A1 | 5/2013 | Haddick et al. | |
| 2013/0135223 A1 | 5/2013 | Shai | |
| 2013/0157565 A1 | 6/2013 | Clement et al. | |
| 2013/0169560 A1* | 7/2013 | Cederlund et al. | 345/173 |
| 2013/0203345 A1 | 8/2013 | Fisher | |
| 2013/0229508 A1 | 9/2013 | Li et al. | |
| 2013/0260689 A1 | 10/2013 | Haverinen et al. | |
| 2013/0285969 A1 | 10/2013 | Raffa et al. | |
| 2013/0290522 A1 | 10/2013 | Behm, Jr. | |
| 2014/0028547 A1 | 1/2014 | Bromley et al. | |
| 2014/0065961 A1 | 3/2014 | Cox | |
| 2014/0085177 A1 | 3/2014 | Lyons et al. | |
| 2014/0101755 A1 | 4/2014 | Tang | |
| 2014/0138447 A1 | 5/2014 | Goldman et al. | |
| 2014/0138449 A1 | 5/2014 | Goldman et al. | |
| 2014/0139422 A1 | 5/2014 | Mistry et al. | |
| 2014/0139454 A1 | 5/2014 | Mistry et al. | |
| 2014/0139486 A1 | 5/2014 | Mistry et al. | |
| 2014/0139637 A1 | 5/2014 | Mistry et al. | |
| 2014/0143737 A1 | 5/2014 | Mistry et al. | |
| 2014/0143784 A1 | 5/2014 | Mistry et al. | |
| 2014/0176809 A1* | 6/2014 | Chen | 348/734 |
| 2014/0180851 A1 | 6/2014 | Fisher | |
| 2014/0187150 A1 | 7/2014 | McFarthing | |
| 2014/0285416 A1 | 9/2014 | Priyantha et al. | |
| 2014/0308930 A1 | 10/2014 | Tran | |
| 2015/0078586 A1 | 3/2015 | Ang et al. | |
| 2015/0133193 A1 | 5/2015 | Stotler | |
| 2015/0160693 A1 | 6/2015 | Stotler | |
| 2015/0220158 A1* | 8/2015 | Elangovan | G06F 3/04815 345/156 |
| 2015/0338916 A1 | 11/2015 | Priyantha et al. | |
| 2016/0334870 A1 | 11/2016 | Priyantha et al. | |

OTHER PUBLICATIONS

Yang, et al., "Magic Finger: Always-Available Input through Finger Instrumentation", In Proceedings of the 25th annual ACM symposium on User interface software and technology, Oct. 7, 2012, pp. 147-156.

Nanayakkara, et al., "EyeRing: A Finger-worn Assistant", In Proceedings of Extended Abstracts on Human Factors in Computing Systems, May 5, 2012, 6 pages.

Shilkrot, et al., "FingerReader: A Wearable Device to Support Text Reading on the Go", In Proceedings of Conference on Human Factors in Computing Systems, Apr. 26, 2014, 6 pages.

Wolf, et al., "Tickle: A Surface-independent Interaction Technique for Grasp Interfaces", In Proceedings of the 7th International Conference on Tangible, Embedded and Embodied Interaction, Feb. 10, 2013, 8 pages.

"Logisys", Published on: Jul. 3, 2004 Available at: http://www.logisyscomputer.com/viewsku.asp?SKUID=MS601BK&DID=KEYBOARD.

Amma, et al., "Airwriting: Hands-free Mobile Text Input by Spotting and Continuous Recognition of 3d-Space Handwriting with Inertial Sensors", In 16th International Symposium on Wearable Computers, Jun. 18, 2012, 8 pages.

Chang, Janie, "Intuitive Uls Featured During UIST 2012", Published on: Oct. 8, 2012 Available at: http://research.microsoft.com/en-us/news/features/uist2012-100812.aspx+.

"Lightglove", Retrieved on: Apr. 28, 2014 Available at: http://lightglove.com/.

"Ring: Shortcut Everything", Retrieved on: Apr. 28, 2014 Available at: https://www.kickstarter.com/projects/1761670738/ring-shortcut-everything.

Saponas, et al., "PocketTouch: Through-Fabric Capacitive Touch Input", In Proceedings of the 24th annual ACM symposium on User interface software and technology, Oct. 16, 2011, 1 page.

"Wearfin", Retrieved on: Apr. 28, 2014 Available at: http://wearfin.com.

Ahmad et al., "A Wearable Input Device for 3D Interaction", ACM SIGGRAPH 2006 Research posters, Jul. 30-Aug. 3, 2006, 1 page.

Chan et al., "FingerPad: Private and Subtle Interaction Using Fingertips", Proceedings of the 26th Annual ACM Symposium on User Interface Software and Technology, Oct. 8-11, 2013, pp. 255-260.

Chen et al., "uTrack: 3D Input Using Two Magnetic Sensors", Proceedings of the 26th Annual ACM Symposium on User Interface Software and Technology, Oct. 8-11, 2013, pp. 237-244.

Gustafson et al., "Imaginary Interfaces: Spatial Interaction with Empty Hands and Without Visual Feedback", Proceedings of the 23nd Annual ACM Symposium on User Interface Software and Technology, Oct. 3-6, 2010, pp. 3-12.

Howard et al., "Lightglove: Wrist-Worn Virtual Typing and Pointing", Proceedings of the 5th IEEE International Symposium on Wearable Computers, Oct. 8-9, 2001, p. 172-173.

Kienzle et al., "LightRing: Always-Available 2D Input on any Surface." Proceedings of the 27th Annual ACM Symposium on User Interface Software and Technology, pp. 157-160, ACM, 2014.

Kim et al., "Digits: Freehand 3D Interactions Anywhere Using a Wrist-Worn Gloveless Sensor", Proceedings of the 25th Annual ACM Symposium on User Interface Software and Technology, Oct. 7-10, 2012, pp. 167-176.

Lam et al., "MIDS: Micro Input Devices System Using MEMS Sensors," IEEE Intelligent Robots and Systems 2002, pp. 1184-1189.

(56) References Cited

OTHER PUBLICATIONS

Mackenzie "Fitts' Law as a Research and Design Tool in Human-Computer Interaction," Human-Computer Interaction, vol. 7, No. 1, pp. 91-139, Mar. 1992.
Morris et al., "Emerging Input Technologies for Always-Available Mobile Interaction", Foundations and Trends in Human-Computer Interaction, vol. 4, No. 4, pp. 245-316, Apr. 2011.
Niikura et al., "Anywhere Surface Touch: Utilizing Any Surface as an Input Area", Proceedings of the 5th Augmented Human International Conference, pp. 1-8, Mar. 7-8, 2014, Kobe, Japan.
Ogata et al., "iRing: Intelligent Ring Using Infrared Reflection", Proceedings of the 25th Annual ACM Symposium on User Interface Software and Technology, Oct. 7-10, 2012, pp. 131-136.
Sturman et al., "A Survey of Glove-Based Input", IEEE Computer Graphics and Applications, vol. 14, No. 1, pp. 30-39, Jan. 1994.
Yang et al., "Magic Finger: Always-Available Input Through Finger Instrumentation", Proceedings of the 25th Annual ACM Symposium on User Interface Software and Technology, Oct. 7-10, 2012, pp. 147-156.
International Search Report and Written Opinion mailed Oct. 26, 2015 from PCT Application No. PCT/US2015/049272, 13 pages.
Gummeson et al., EnGarde: Protecting the Mobile Phone from Malicious NFC Interactions', MobiSys '13, Jun. 25-28, 2013, Taipei, Taiwan, 14 pages.
Harrison et al., "Skinput: Appropriating the Body as an Input Surface", Proceedings of the ACM International Conference of Human-Computer Interaction, Apr. 10, 2010, 10 pages.
Harrison et al., "Scratch Input: Creating Large, Inexpensive, Unpowered and Mobile Finger Input Surfaces", Proceedings of the 21st Annual ACM Symposium on User Interface Software and Technology, Oct. 19, 2008, pp. 205-208, 4 pages.
Harrison et al., "TapSense: Enhancing Finger Interaction on Touch Surfaces", Proceedings of the 24th Annual ACM Symposium on User Interface Software and Technology, Oct. 16, 2011, 8 pages.
Kye Systems Corp., "Ring mouse", retrieved from <<http://www.geniusnet.com/wSite/public/Mmo/4/ Ring_Mouse_fjpg>>, on Jan. 29, 2013, 1 page.
Liu et al., "uWave: Accelerometer-based personalized gesture recognition and its applications", Pervasive and Mobile Computing 5, 2009, pp. 657-675, 19 pages.
Lopes et al., "Augmenting Touch Interaction Through Acoustic Sensing", Proceedings of the ACM International Conference on Interactive Tabletops and Surfaces, Nov. 13-16, 2011, 4 pages.
Lukowicz et al., "Detecting and Interpreting Muscle Activity with Wearable Force Sensors", Pervasive Computing Lecture Notes in Computer Science, vol. 3968, May 7, 2006, pp. 101-116, 16 pages.
Murray-Smith et al., "Stane: Synthesized Surfaces for Tactile Input", CHI 2008, Apr. 5-10, 2008, Florence, Italy, 4 pages.
Ogris et al., "Using FSR based muscle activity monitoring to recognize manipulative arm gestures", Proceedings of the 11th IEEE International Symposium on Wearable Computers, Jan. 2007, 4 pages.
Pedley, Mark, "Tilt Sensing Using a Three-Axis Accelerometer", Freescale Semiconductor, Document No. AN3461, Rev. 6, Mar. 2013, 22 pages.
Schlomer et al., "Gesture Recognition with a Wii Controller", TEI '08, Feb. 18-20, 2008, Bonn, Germany, pp. 11-14, 4 pages.
Shepard et al., "LiveLab: Measuring Wireless Networks and Smartphone Users in the Field", ACM SIGMETRICS Performance Evaluation Review, 2011, 38(3), pp. 15-20, 6 pages.
Texas Instruments, "HF Antenna Design Notes", Technical Application Report, SCBA034, Sep. 2003, 51 pages.
Non-Final Office Action mailed Jun. 29, 2015 from U.S. Appl. No. 14/286,910, 22 pages.
Response filed Sep. 25, 2015 to the Non-Final Office Action mailed Jun. 29, 2015 from U.S. Appl. No. 14/286,910, 11 pages.
Final Office Action mailed Nov. 13, 2015 from U.S. Appl. No. 14/286,910, 36 pages.
Response filed Feb. 1, 2016 to the Final Office Action mailed Nov. 13, 2015 from U.S. Appl. No. 14/286,910, 12 pages.
Applicant-Initiated Interview Summary mailed Feb. 2, 2016 from U.S. Appl. No. 14/286,910, 3 pages.
Notice of Allowance mailed Feb. 18, 2016 from U.S. Appl. No. 14/286,910, 12 pages.
Notice of Allowance mailed Jun. 1, 2016 from U.S. Appl. No. 14/286,910, 10 pages.
Notice of Allowability mailed Jun. 23, 2016 from U.S. Appl. No. 14/286,910, 10 pages.
Notice of Allowability mailed Aug. 26, 2016 from U.S. Appl. No. 14/286,910, 6 pages.
International Search Report and Written Opinion mailed Aug. 4, 2016 from PCT Patent Application no. PCT/US2015/031290, 9 pages.
Response and Demand filed Nov. 18, 2015 from PCT Patent Application No. PCT/US2015/031290, 7 pages.
Second Written Opinion mailed Apr. 28, 2016 from PCT Patent Application No. PCT/US2015/031290, 6 pages.
International Preliminary Report on Patentability mailed on Aug. 1, 2016 from PCT Patent Application No. PCT/US2015/031290, 8 pages.
Agrawal et al., "Using Mobile Phones to Write in Air", MobiSys '11, Jun. 28-Jul. 1, 2011, Bethesda, Maryland, 14 pages.
Akay, Adnan, "Acoustics of friction", The Journal of the Acoustical Society of America, 111 (4), Apr. 2002, pp. 1525-1548, 24 pages.
Amft et al., "Sensing Muscle Activities with Body-Worn Sensors", Proceedings of the International Workshop on Wearable and Implantable Body Sensor Networks, Apr. 3, 2006, 4 pages.
Chang et al., "LIBSVM: A Library for Support Vector Machines", ACM Transactions on Intelligent Systems and Technology, vol. 2, No. 3, Apr. 2011, 27 pages.
Cypress Semiconductor, "CY3290-TMA400EVK TrueTouch Gen4 Evaluation Test Kit", retrieved at http://www.cyrpress.com// documentationk/development-kitsboards/cy2390-tma400evk-truetouch-gen4-evalutation-test-kit>> on Sep. 11, 2015, 2 pages.
Dunlop et al., "The Challenge of Mobile Devices for Human Computer Interaction", Personal and Ubiquitous Computing, Jan. 2002, pp. 235-236, 2 pages.
Eronen et al., "User Interfaces for Digital Television: A Navigator Case Study", AVI 2000, ACM, pp. 276-279, 4 pages.
Genius Kye Systems Group, "Wireless Thumb Cursor Controller", retrieved from <<http://www.genuisnet.com/Genius/wSite/ct?xItem=51880&ctNode=3619&mp=1>>, on Sep. 11, 2015, 1 page.
Goel et al., "SurfaceLink: Using Inertial and Acoustic Sensing to Enable Multi-Device Interaction on a Surface", CHI 14', Apr. 26-May 1, 2014, Toronto, Ontario, Canada, 10 pages.
Gummeson et al., "An Energy Harvesting Wearable Ring Platform for Gesture Input on Surfaces", MobiSys '14, Jun. 16-19, 2014, Bretton Woods, New Hampshire, 14 pages.
Non-Final Office Action mailed Jun. 24, 2014 from U.S. Appl. No. 13/847,900, 17 pages.
Response filed Sep. 22, 2014 to the Non-Final Office Action mailed Jun. 24, 2014 from U.S. Appl. No. 13/847,900, 11 pages.
Final Office Action mailed Oct. 29, 2014 from U.S. Appl. No. 13/847,900, 20 pages.
Response filed Jan. 28, 2015 to the Final Office Action mailed Oct. 29, 2014 from U.S. Appl. No. 13/847,900, 12 pages.
Non-Final Office Action mailed Feb. 18, 2015 from U.S. Appl. No. 13/847,900, 13 pages.
Response filed May 11, 2015 to the Non-Final Office Action mailed Feb. 18, 2015 from U.S. Appl. No. 13/847,900, 10 pages.
Final Office Action mailed Jun. 19, 2015 from U.S. Appl. No. 13/847,900, 13 pages.
Response filed Sep. 16, 2016 to the Final Office Action mailed Jun. 19, 2015 from U.S. Appl. No. 13/847,900, 11 pages.
Non-Final Office Action mailed Oct. 5, 2015 from U.S. Appl. No. 13/847,900, 13 pages.
Response filed Jan. 5, 2016 to the Non-Final Office Action mailed Oct. 5, 2015 from U.S. Appl. No. 13/847,900, 10 pages.
Final Office Action mailed Mar. 11, 2016 from U.S. Appl. No. 13/847,900, 19 pages.
Response filed May 17, 2016 to the Final Office Action mailed Mar. 11, 2016 from U.S. Appl. No. 13/847,900, 11 pages.

(56) References Cited

OTHER PUBLICATIONS

Non-Final Office Action mailed Jun. 24, 2016 from U.S. Appl. No. 13/847,900, 16 pages.
International Search Report and Written Opinion mailed Jun. 25, 2014 from PCT Patent Application No. PCT/US2014/031145, 9 pages.
International Preliminary Report on Patentability mailed Oct. 1, 2015 from PCT Patent Application No. PCT/US2014/031145, 7 pages.
Notice of Allowance mailed Sep. 9, 2015 from U.S. Appl. No. 14/273,238, 12 pages.
International Search Report and Written Opinion mailed Jul. 28, 2015 from PCT Patent Application No. PCT/US2015/028682, 12 pages.
Demand filed Nov. 10, 2015 from PCT Patent Application No. PCT/US2015/028682, 10 pages.
Second Written Opinion mailed Apr. 28, 2016 from PCT Patent Application No. PCT/US2015/028682, 7 pages.
Notice of Allowance mailed Feb. 16, 2016 from U.S. Appl. No. 14/987,526, 8 pages.
Notice of Allowability mailed Nov. 4, 2016 from U.S. Appl. No. 14/286,910, 20 pages.
Response filed Sep. 25, 2016 to the Non-Final Office Action mailed Jun. 24, 2016 from U.S. Appl. No. 13/847,900, 12 pages.
International Preliminary Report on Patentability mailed Aug. 17, 2016 from PCT Patent Application No. PCT/US2015/028682, 8 pages.
Non-Final Office Action mailed Nov. 18, 2016 from U.S. Appl. No. 15/287,500, 11 pages.
Notice of Allowability mailed Dec. 8, 2016 from U.S. Appl. No. 14/286,910, 6 pages.
Notice of Allowability mailed Dec. 20, 2016 from U.S. Appl. No. 14/286,910, 6 pages.
Final Office Action mailed Dec. 22, 2016 from U.S. Appl. No. 13/847,900, 15 pages.
Communication pursuant to Rule 161(1) and 162 EPC mailed Dec. 15, 2016 from European Patent Application No. 15722634.1, 2 pages.

\* cited by examiner

SCENARIO 200
INSTANCE 1
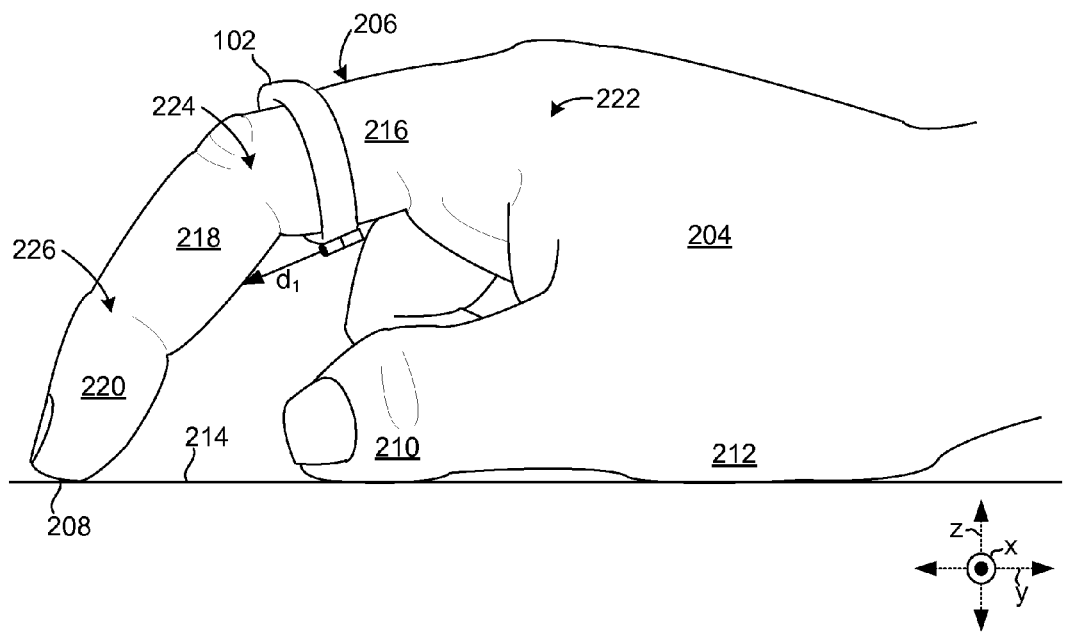
INSTANCE 2
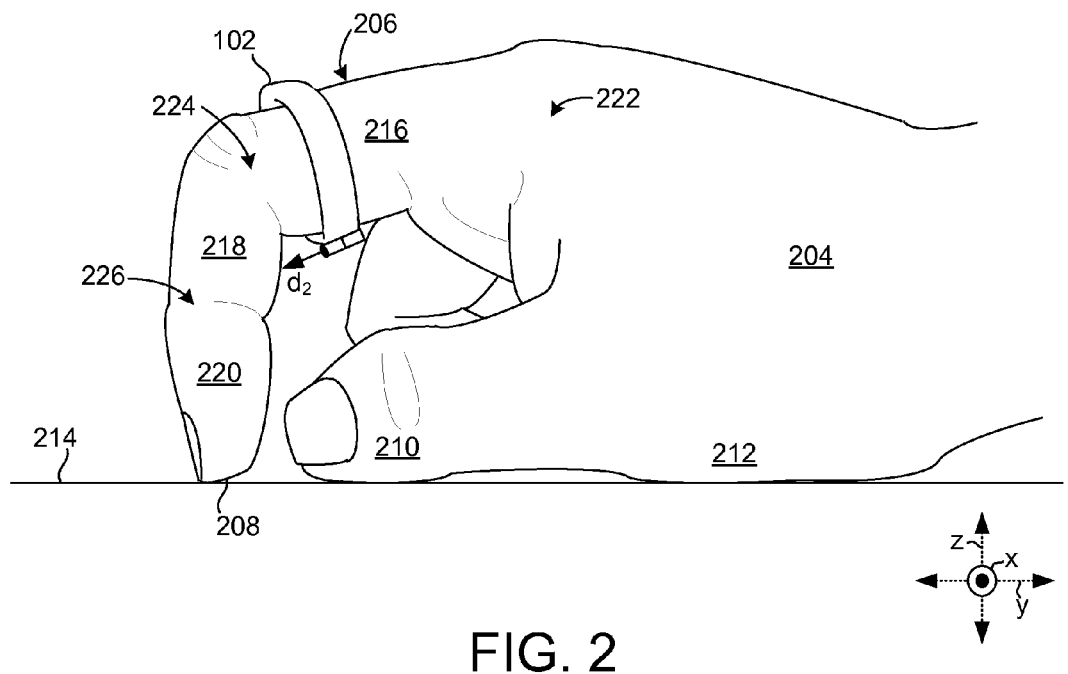
FIG. 2

SCENARIO 200

SCENARIO 400

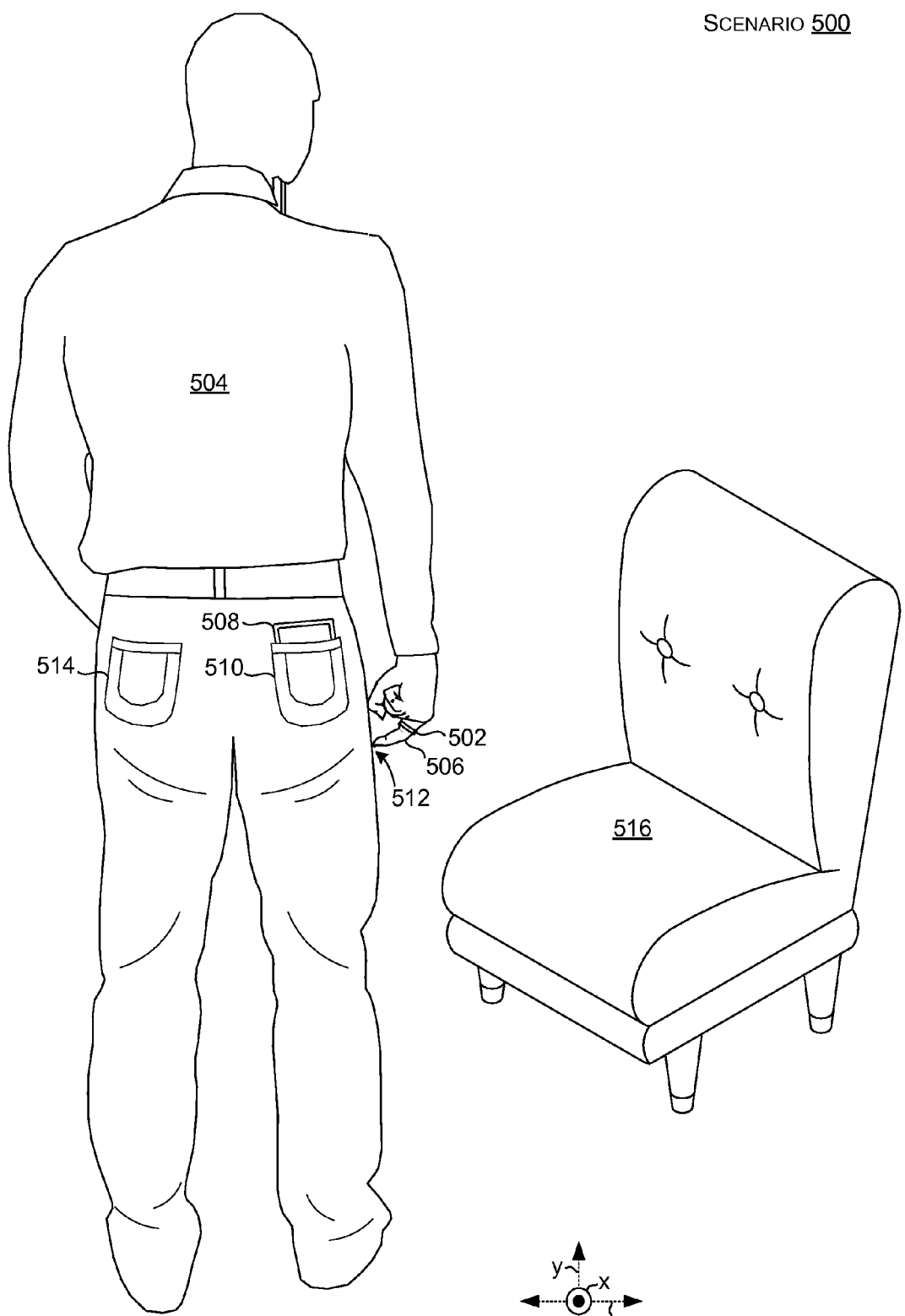
SCENARIO 500
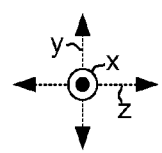
FIG. 5

SCENARIO 800
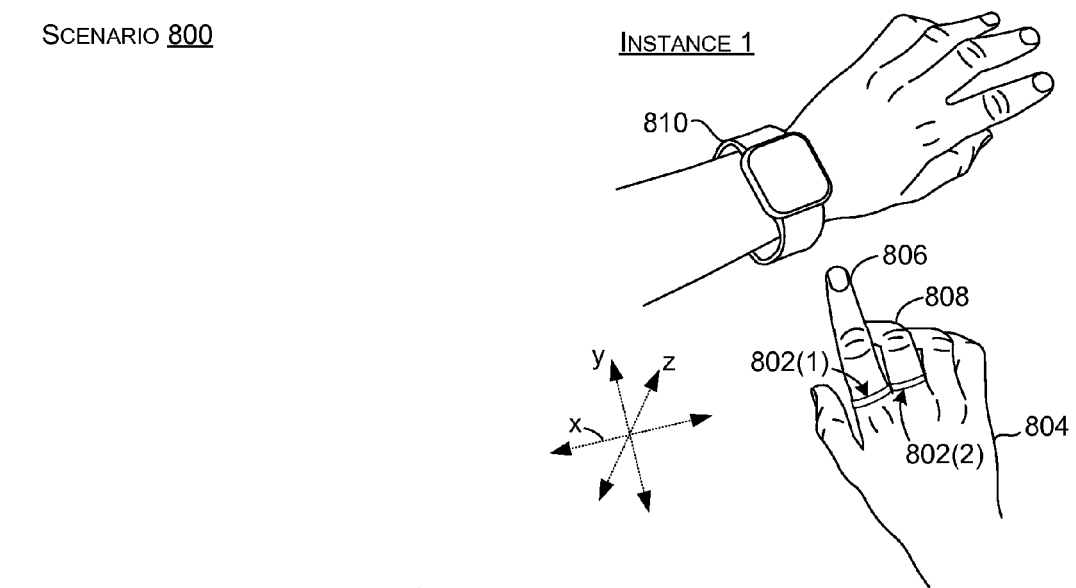
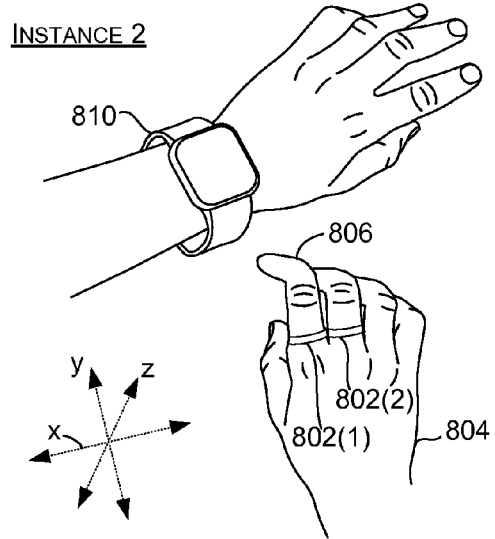
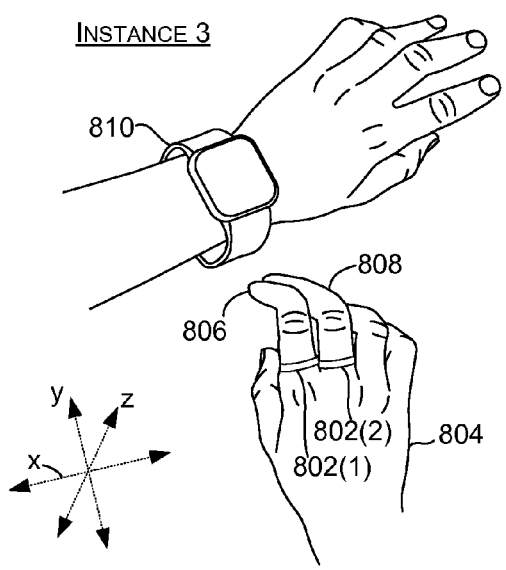
FIG. 8

SMART RING

BACKGROUND

Computing devices are being manufactured in ever more form factors. Many of these form factors do not lend themselves to traditional user input technologies, such as keyboard and mouse. For example, wearable devices such as glasses, wrist bands, and watches tend to have limited input options. For instance, small wearable smart devices may have a small interface with a lack of touch real estate, or the positioning of the device itself may make interaction difficult. The present concepts can offer user control options for many different types of computing devices.

SUMMARY

The description relates to a smart ring. In one example, the smart ring can be configured to be worn on a first segment of a finger of a user. The example smart ring can include at least one flexion sensor secured to the smart ring in a manner that can detect a distance between the at least one flexion sensor and a second segment of the finger. The example smart ring can also include an input component configured to analyze signals from the at least one flexion sensor to detect a pose of the finger.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

FIGS. 2-4 show finger pose examples in accordance with some implementations of the present concepts.

FIG. 5-8 show additional smart ring use case scenario examples in accordance with some implementations of the present concepts.

DETAILED DESCRIPTION

Overview

The present concepts relate to a smart ring that can allow a user to use his/her finger to control a companion device. Implementations relate to a smart ring (e.g., smart ring device, wearable ring device, finger-worn device) worn on a user's finger. The smart ring can detect a pose of the finger (e.g., finger pose, position). In some cases, the smart ring can also define a coordinate system relative to the finger, and detect the finger pose relative to one or more axes of the coordinate system. The smart ring can also detect and/or interpret movement of the finger and/or fingertip (e.g., change in finger pose) relative to the coordinate system. The smart ring can wirelessly transmit information related to the pose and/or movement of the finger to control the companion device.

First Smart Ring Use Case Scenario Example

Figure 1:
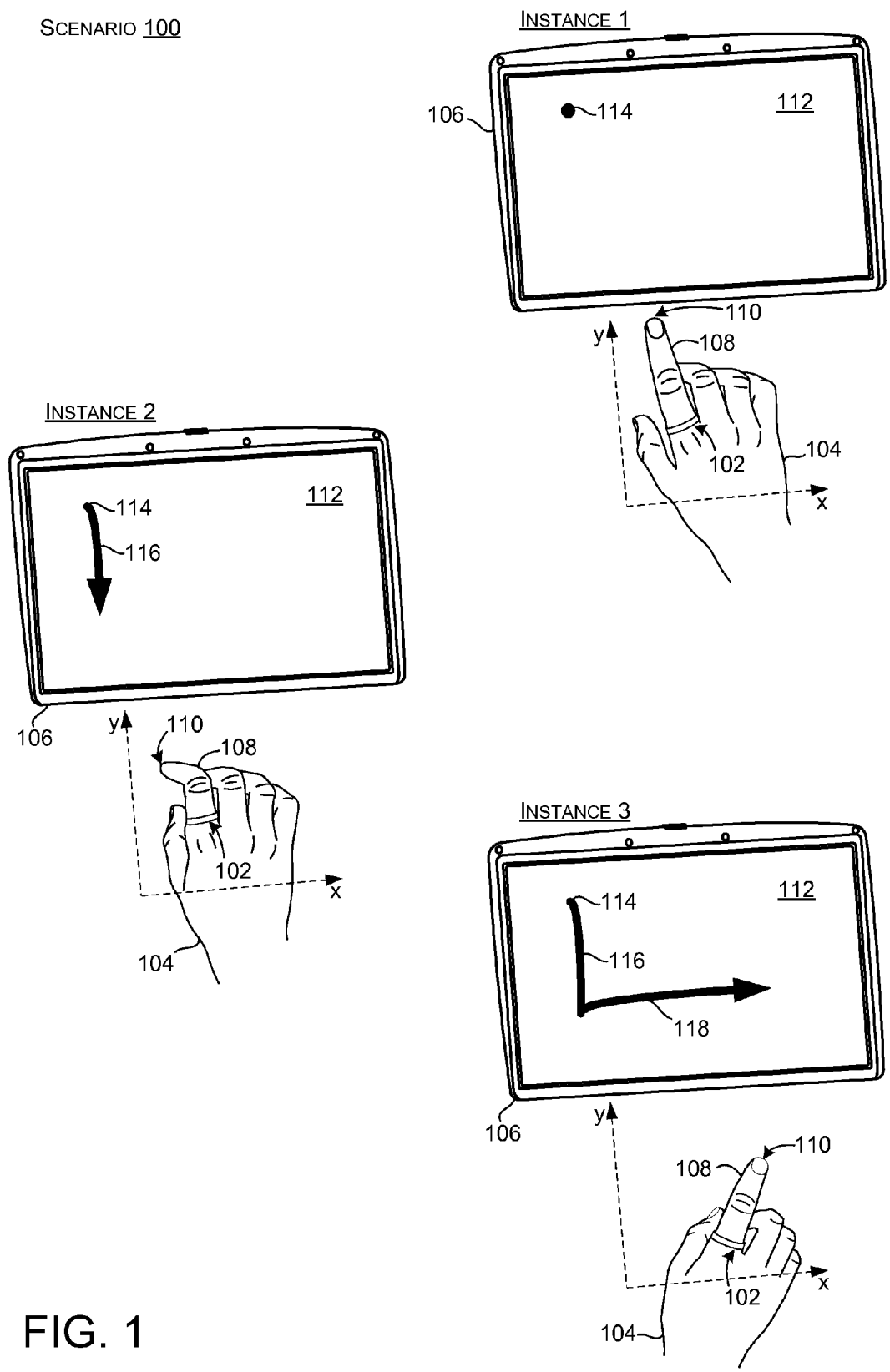
FIG. 1 shows a first smart ring use case scenario example in accordance with some implementations of the present concepts.

FIG. 1 illustrates an example use case scenario 100 in accordance with some implementations of the present concepts. In scenario 100, an example smart ring 102 is worn by a user 104. User 104 can be using the smart ring to interact with an example companion device 106. In this example, only a single smart ring 102 is employed. However, user 104 could wear multiple smart rings 102 (e.g., on multiple fingers, including thumbs).

As shown in Instance 1 of FIG. 1, user 104 is wearing the smart ring 102 on his index finger 108. The smart ring 102 can be worn near the base of the index finger (e.g., finger base), opposite a fingertip 110. (As used herein, the term 'finger' can include the 'thumb').

FIG. 1 illustrates Instance 1, Instance 2, and Instance 3 of interaction by user 104 with companion device 106 using the smart ring 102. In this case, companion device 106 is a tablet-type device with a display 112. As shown in Instance 1 of FIG. 1, the index finger 108 of user 104 is extended such that the fingertip 110 is toward an upper left hand area of the x-y reference axes. In some implementations, the smart ring 102 can detect the pose of the finger; in this case, the finger is relatively extended.

As shown in Instance 2 of FIG. 1, the index finger 108 is relatively flexed (e.g., bent). Thus, in Instance 2, the fingertip 110 is relatively lower with respect to the y reference axis as compared to Instance 1. In this case, the smart ring 102 can detect the relative flexion of the finger. As shown in Instance 3 of FIG. 1, the user has rotated his index finger such that the fingertip has generally moved toward the right along the x reference axis. In this case, the smart ring can detect the relative extension (similar to Instance 1) of the index finger, and/or that the finger is rotated (e.g., changed in orientation) as compared to Instances 1 and 2.

In some cases, control of the companion device 106 by the smart ring 102 can include the finger pose corresponding to a location on the display 112 of the companion device 106, such as to control a cursor location. For example in Instance 1, point 114 on the display 112 of the companion device 106 can correspond to a relative location of the fingertip 110 in the x-y reference plane. Note that the location of point 114 is generally toward an upper left hand area of the display, corresponding to the pose of the index finger 108.

In other cases, control of the companion device 106 by the smart ring 102 can include the finger pose corresponding to a work-engaging hand pose. For example, detection of the relative flexion of the finger (Instance 2) can be interpreted to indicate that the hand is in a position similar to a hand holding a computer mouse. In some implementations, one or more smart rings can be used to approximate a virtual computer mouse (e.g., to mimic computer mouse actions). For example, the finger pose shown in Instance 2 can be detected by the smart ring and used to alert the companion device to receive virtual computer mouse control input. The smart ring can then be used to detect subsequent control input that mimics computer mouse use, such as moving a cursor or clicking right or left mouse buttons, for example.

In some implementations, the smart ring 102 can detect the change in pose of the index finger 108 from Instance 1 to Instance 2, representing flexion. The smart ring 102 can also detect the change in pose of the index finger 108 from Instance 2 to Instance 3, representing extension and rotation.

Flexion/extension-type finger movements will be discussed in more detail relative to FIG. 2. Rotation-type finger movements will be discussed in more detail relative to FIGS. 3-4.

Furthermore, in some implementations, the smart ring 102 can interpret change(s) in finger pose as a movement(s) of the fingertip. For example, finger pose changes can be interpreted as movement of the fingertip in the x-y reference plane of FIG. 1.

In some cases, movement of the index finger 108 can be detected by the smart ring 102 and interpreted for control of the companion device 106, depending on a computing environment (e.g., context) of the companion device. For example, in a case where the user 104 is using the smart ring to interact with a drawing program on the companion device, the movement of the index finger from Instance 1 to Instance 2 can be interpreted as stroke 116 on the display 112 (e.g., on the GUI of the drawing program). Also in this case, the movement of the index finger from Instance 2 to Instance 3 can be interpreted as stroke 118 on the display 112. In another example, the user can be using the smart ring to interact with a web browser. In this case, the movement of the index finger from Instance 1 to Instance 2 could be interpreted as scrolling of search results on the display. In yet other examples, the finger movement could be interpreted as a control input to drag an item on the display. These examples are not meant to be limiting, instead the detected finger movement and/or pose can be mapped to any of a variety of control inputs (e.g., user inputs).

In summary, the smart ring can sense finger pose and/or fine-grained, subtle fingertip motion from the finger base, which enables readily-available finger control input with a device that looks and feels like an ordinary ring. The smart ring can sense finger pose and/or track subtle fingertip movements from the finger base without requiring instrumentation of the fingertip (e.g., without the user wearing something on his/her fingertip). This keeps normal hand function of the user intact and allows for a socially acceptable appearance.

Finger Post Examples

Figure 3:
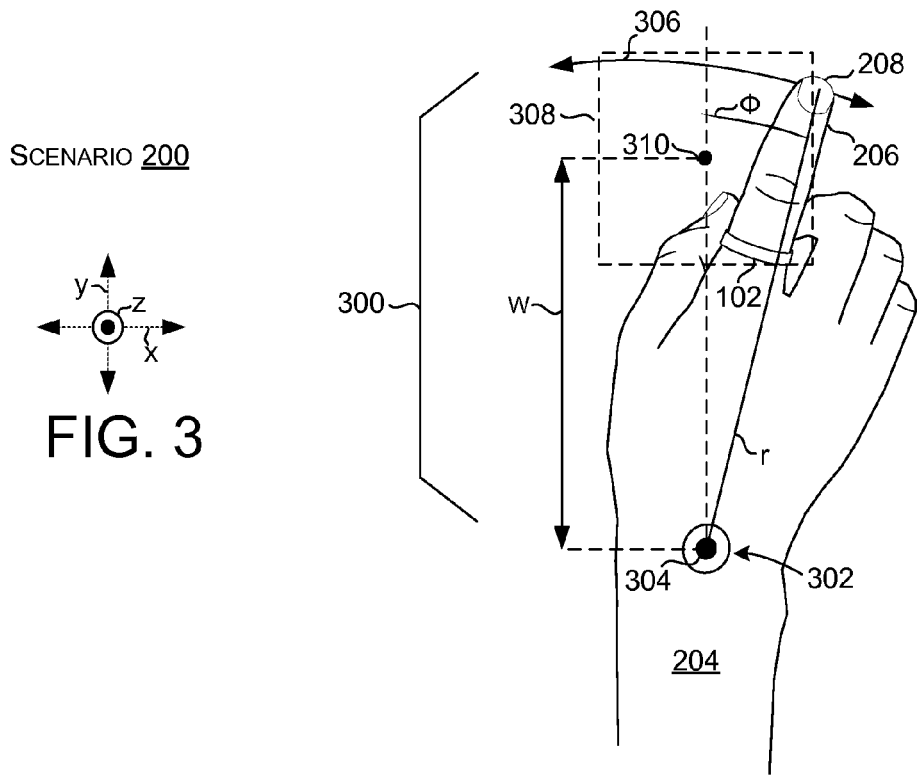
Figure 4:
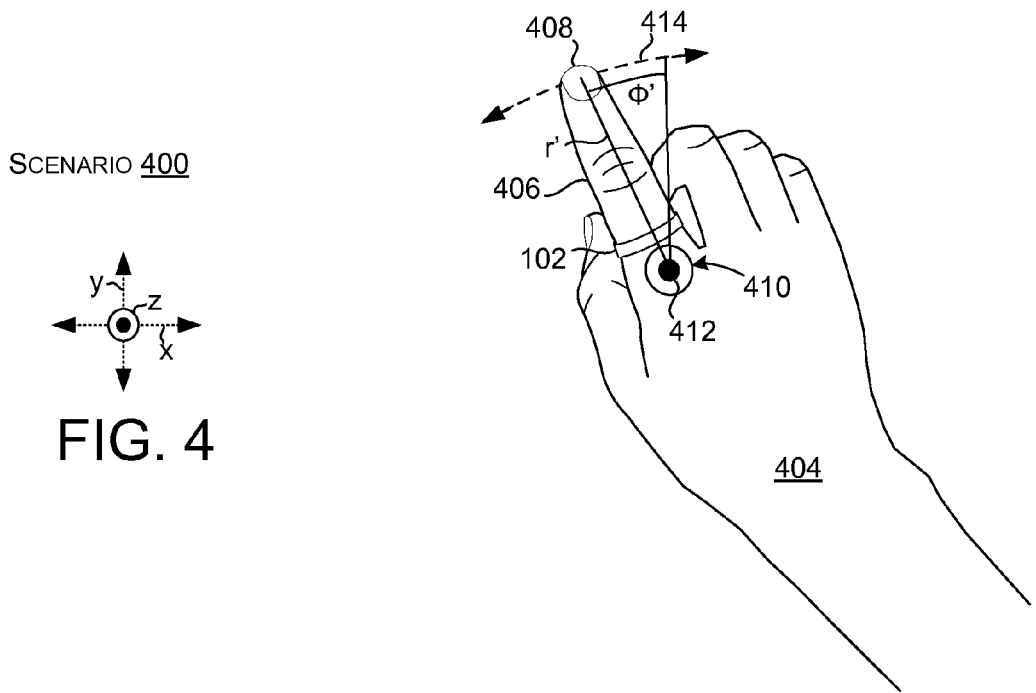

FIGS. 2-4 illustrate example finger poses in accordance with some implementations of the present concepts.

FIGS. 2-3 show example scenario 200. In scenario 200, example smart ring 102 is worn by user 204 on his index finger 206. FIG. 2 shows views along the x axis of the x-y-z reference axes and FIG. 3 shows a view along the z axis. FIGS. 2-3 will be used to describe different finger poses. FIGS. 2-3 also illustrate a coordinate system which can be used to describe movement of the fingertip 208 in the x-y plane.

As can be appreciated from FIG. 2, the fingertip 208 of the index finger 206, the thumb 210, and/or the palm 212 of user 204 can be resting on a surface 214, such as a desk or table top. In some cases, the fingertip 208 can refer to an end of the index finger 206 that naturally or comfortably touches the surface 214 when user 204 rests his palm 212 on the surface.

As shown in FIG. 2, the index finger 206 can have a first segment 216 (e.g., proximal phalanx), second segment 218 (e.g., middle phalanx), and third segment 220 (e.g., distal phalanx). In this example, the smart ring 102 can be worn on the first segment 216 of the index finger 206. The index finger can also have a first joint 222 (e.g., metacarpal phalangeal joint), a second joint 224 (e.g., proximal interphalangeal joint), and a third joint 226 (e.g., distal interphalangeal joint).

FIG. 2 includes Instance 1, where the index finger 206 is relatively extended, with the fingertip 208 further away from the thumb 210 and/or palm 212 along the y axis. FIG. 2 also includes Instance 2, where the index finger is relatively flexed, with the fingertip 208 relatively closer to the thumb 210 and/or palm 212 along the y axis.

In some cases, finger movement can include flexion (e.g., bending) and/or extension (e.g., straightening). A progression from the relative extension of the index finger in Instance 1 to the relative flexion in Instance 2 can be considered flexion of the index finger. In some cases, the flexion or extension can be effected through first joint 222, second joint 224, and/or third joint 226.

In some cases, flexion (e.g., bending) of the second joint 224 can cause a change in distance from the first segment 216 to the second segment 218 of the index finger. In Instance 1 of FIG. 2, the smart ring 102 can be a distance $d_1$ to the second segment 218. In Instance 2, the smart ring 102 can be a distance $d_2$ to the second segment 218. In this case distance $d_2$ is smaller than distance $d_1$, corresponding to the second segment 218 being closer to the smart ring in Instance 2. In some implementations, the smart ring can determine distance $d_1$, distance $d_2$, and/or a change from distance $d_1$ to distance $d_2$. Discussion of example components for determining distances such as distance $d_1$ and distance $d_2$ is provided relative to FIG. 9.

Alternatively or additionally, the smart ring 102 can determine distances between other fingers, finger segments, the smart ring, etc. in order to detect finger pose(s). For example, in some implementations the smart ring may detect or approximate a distance from the third segment 220 to the thumb 210, or from the third segment to the palm 212.

Furthermore, in some cases the palm 212 can be resting in a relatively fixed position on the surface 214. In this case, with the palm resting in a relatively fixed position on the surface, flexion or extension of the index finger can cause movement of the fingertip in the y direction relative to the surface. In some implementations, the smart ring 102 can interpret flexion/extension-type changes in finger pose as movement of the fingertip in the y direction.

As described relative to Instances 2 and 3 of FIG. 1, the smart ring 102 can detect poses of the index finger 108 that differ by rotation as well as flexion/extension of the finger. Referring now to FIG. 3, rotational movement of the finger can be correlated to an x-y-z coordinate system.

FIG. 3 illustrates a view along the z axis, with smart ring 102 worn by user 204 on his index finger 206. Similar to the example in Instance 3 of FIG. 1, the index finger is relatively extended in FIG. 3. In some cases, the user 204 can move his index finger 206 and/or fingertip 208 by rotating his hand 300 with respect to the z axis of the x-y-z reference axes. For example, as shown in FIG. 3, the user can rotate (e.g., pivot) his hand at the wrist 302 (e.g., carpus), and the wrist can be considered an anchor point 304. In this example, the fingertip 208 can follow an arc 306. In FIG. 3, the arc 306 is at radius r from the anchor point 304. Note that if the flexion/extension of the finger changes, radius r will also change.

In the example shown in FIG. 3, angle φ can be considered an amount of rotational movement of the fingertip. Stated another way, rotation of the index finger can be a rotation rate dφ (e.g., delta φ). In some implementations, the user's comfortable motion range can have a physical size (e.g., area) that can define a unit square 308. In some cases, a center of the unit square can be considered an origin 310 of a coordinate system. The origin can be at a fixed distance w to the anchor point 304.

Elements of the coordinate system relative to the wrist (e.g., w, r, φ) can be considered parts of a wrist coordinate system. The coordinate system shown in FIG. 3 is not meant to be limiting, for example, other sizes and/or locations for the unit square, origin, anchor point, etc. are considered. Techniques for mapping radius r and angle φ to locations and/or movements relative to the x and y axes of the coordinate system will be described in detail relative to FIG. 9.

In some implementations, the coordinate system shown in FIG. 3 can be fixed with respect to a surface, such as surface 214 shown in FIG. 2. For example, in the case where the user 204 is resting his palm 212 on the surface 214 in a relatively fixed position, the anchor point 304 in FIG. 3 could correspond to the relatively fixed position of the palm 212 on the surface 214 in FIG. 2. In this case, rotational movement (e.g., angle φ) of the index finger 206 detected by the smart ring 102 could be correlated to movement of the fingertip 208 in the x direction on the surface. Also, flexion/extension-type movement (e.g., radius r) of the index finger detected by the smart ring could be correlated to movement of the fingertip in the y direction on the surface.

In some implementations, the location of the axis of rotation may be different than that shown in FIG. 3, although the rotation may still be about the z axis. An example is illustrated in FIG. 4. FIG. 4 shows an example scenario 400 where example smart ring 102 is worn by user 404 on his index finger 406. In scenario 400, user 404 can move his index finger 406 and/or fingertip 408 by rotating the index finger 406 with respect to the z axis of the x-y-z reference axes. In this example, the user can rotate (e.g., pivot) his index finger at the first joint at 410 (e.g., adduction, abduction), and the first joint can be considered an anchor point 412. In this example, the fingertip 408 can move along an arc 414 which is at radius r' from the anchor point 412. In this case, angle φ' can be considered an amount of rotational movement of the fingertip. In some implementations, the coordinates (e.g., r', φ') relative to the first joint can be considered part of a first joint coordinate system. In other examples, an axis of rotation may pass through yet another point in the x-y plane (e.g., a point relative to the user's elbow).

To summarize, in some implementations a smart ring can be used to detect a pose of the finger upon which the smart ring is worn. In some cases, the smart ring can detect a change in the pose of the finger. Furthermore, a coordinate system for movement of a fingertip of a user can be defined. The smart ring can then be used to track movement of the fingertip relative to the coordinate system. For example, the smart ring can track subtle fingertip movements in an x-y plane of any surface.

Additional Smart Ring Use Case Scenario Examples

FIGS. 5-8 illustrate additional example use case scenarios.

FIG. 5 shows example use case scenario 500. In scenario 500, an example smart ring 502 is worn by a user 504 on his index finger 506. This scenario also involves an example companion device 508. Companion device 508 is positioned in a right back pocket 510 of user 504. FIG. 5 shows user 504 touching the side of his pant leg 512 with his index finger 506.

In this example, a pose(s) of the index finger 506 can be detected by smart ring 502. In this case, the pose and/or changes in the pose can be interpreted as control input (e.g., user input), such as input to control companion device 508. Further, the interpretation can be applied, such as with an action involving the companion device 508. For example, companion device 508 can be a smart phone type device. User 504 can receive a phone call on the smart phone, and may wish to decline the phone call without taking the companion device 508 out of his back pocket. In this case, user 504 can perform a gesture with his index finger. The gesture can be detected by the smart ring. The smart ring can communicate the gesture to companion device 508. The companion device 508 can interpret the gesture within a context of a computing environment of the companion device 508. In this example, the companion device 508 can interpret the gesture to decline the phone call. Mechanisms for accomplishing this functionality are described below relative to FIG. 9.

In some implementations, gestures detected by the smart ring 502 can be communicated to the companion device 508 without line-of-sight (e.g., optical transmission). For example, in FIG. 5 the companion device 508 is in the back pocket 510 of the user 504. Alternatively or additionally to the companion device 508 being in a pocket, the user 504 could be using the smart ring while his hand is in a pocket (e.g., a front pants pocket).

In some implementations, finger poses and/or movements can be detected by the smart ring 502 regardless of a surface material that the finger 506 and/or hand may be touching. In some cases, the surface or material need not be rigid. For example, the pant leg 512 shown in FIG. 5 is not a rigid surface or material.

In the example shown in FIG. 5, the fingertip of the index finger 506 can move vertically up and down the pant leg 512 in the y direction, or horizontally back and forth on the pant leg in the x direction (in and out of the drawing page). This x-y coordinate system can be used to describe control input with the smart ring 502 to the companion device 508. In some implementations, the orientation of the companion device 508 can be independent of the coordinate system associated with the smart ring. For example, the companion device 508 could be located in the right back pocket 510 of user 504, in the left back pocket 514, in a front pocket (not shown), held by user 504 in his hand (e.g., held in his left hand), or located somewhere else, such as resting on chair 516 or at a remote location. As such, the companion device 508 could be in any of a variety of locations, positions, or orientations and receive control input from the smart ring. In this case, the companion device 508 can map finger poses and/or movements collected relative to a coordinate system of the smart ring to an appropriate orientation of the companion device 508.

Figure 6:
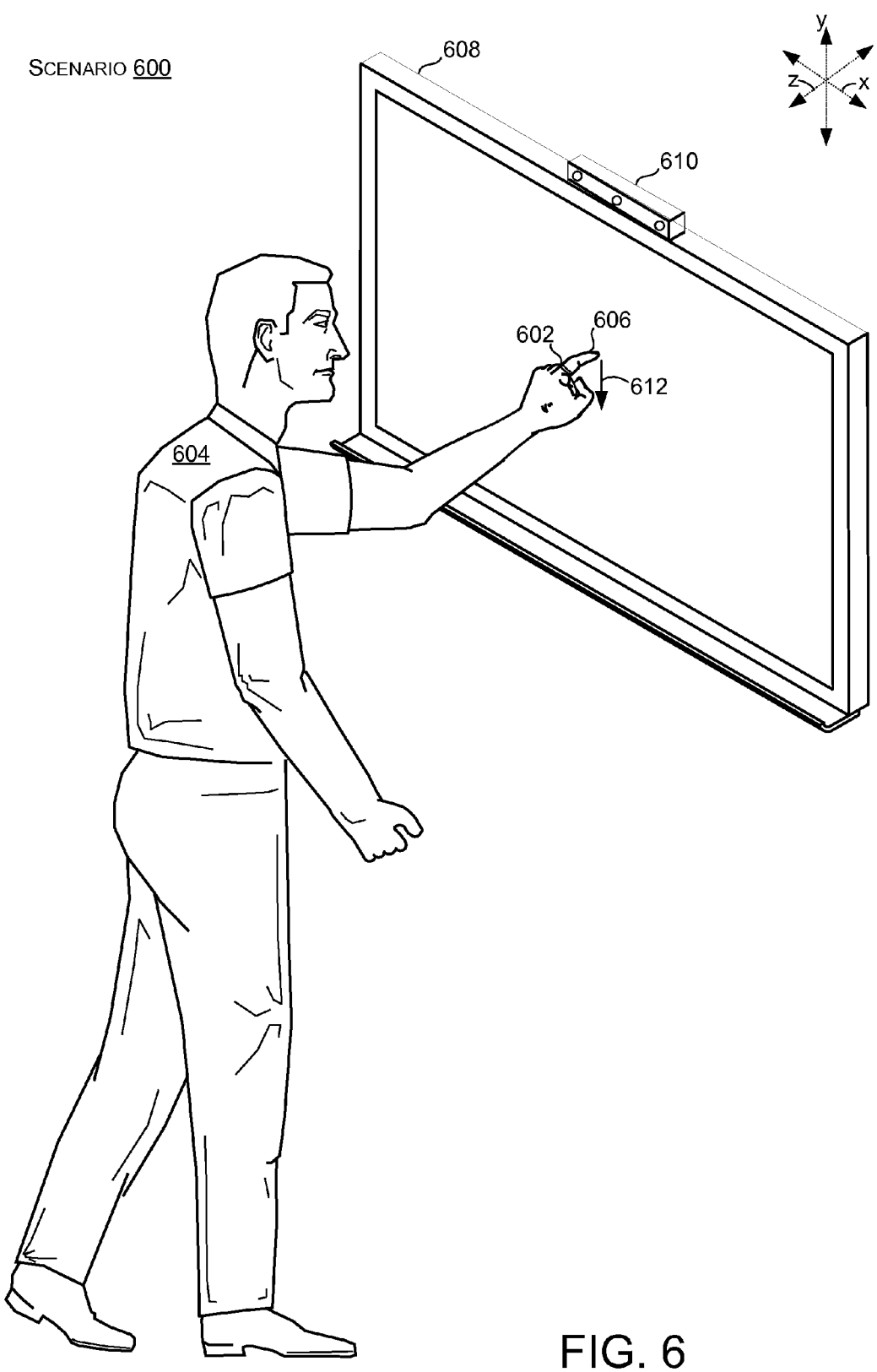

FIG. 6 shows a use case scenario 600 involving an example smart ring 602 worn by a user 604 on his index finger 606. In this case user 604 is engaging a digital display device 608 (e.g., companion device). In this example, the digital display device includes a depth sensor 610. In some implementations the depth sensor can be manifest as a red, green, blue, plus depth (RGBD) camera. Various types of visible light, non-visible light, and/or sonic depth sensors, among others, can be employed.

The depth sensor 610 can be useful in detecting the presence of user 604 in front of the digital display device 608 and detecting large-scale gestures (e.g., arm movements) performed by the user in front of the digital display device. However, the depth sensor may not be able to accurately detect user control inputs close to the digital display device. For instance, the depth sensor may not be able to distinguish fine-grained, subtle fingertip motions (e.g., stroke input). The smart ring 602 can sense subtle fingertip motions, such as stroke input in a downward direction as indicated by arrow 612. Data from the depth sensor 610 and the smart ring 602 can detect large-scale user gestures in front of the digital display device as well as smaller-scale, subtle fingertip motions at the digital display device. Thus, the smart ring 602 and the depth sensor 610 can collectively provide information that can allow the digital display device to function in a manner similar to a touch sensitive display device without actually being 'touch sensitive.'

Figure 7:
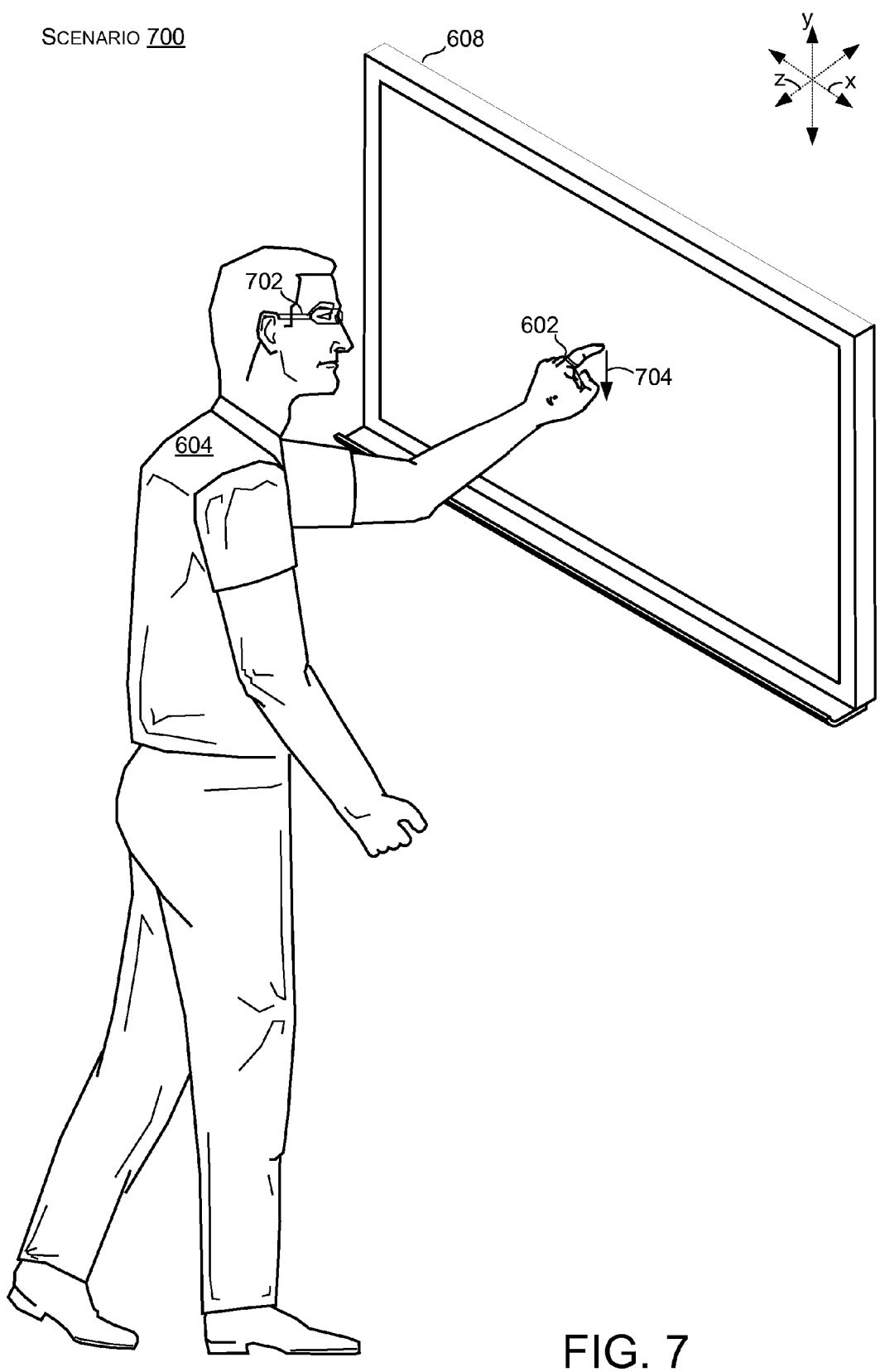

FIG. 7 shows another use case scenario 700 that is similar to the use case scenario of FIG. 6. In this case, the smart ring 602 can operate cooperatively with smart glasses 702 to provide information about user 604. For instance, the smart glasses can capture information about what is in front of the user. In this example, the smart glasses can 'see' content on the digital display device 608. The smart glasses may be less effective at distinguishing fine-grained, subtle fingertip motions as control input to the digital display device 608. However, as explained above relative to FIG. 6, the smart ring 602 can accurately determine small-scale control input, such as stroke input 704. The smart ring 602 and the smart glasses 702 can communicate with the digital display device 608 to detect touch and/or non-touch user gestures to provide an enhanced interactive experience to the user.

FIG. 8 shows a use case scenario 800 involving example smart rings 802(1) and 802(2) worn by a user 804. Smart ring 802(1) is positioned on the user's index finger 806 and smart ring 802(2) is positioned on the user's middle finger 808. In this case user 804 is engaging a smart watch 810 (e.g., companion device) at Instance 1, Instance 2, and Instance 3. In some implementations, the smart ring(s) can detect finger pose(s) whether or not the finger(s) and/or hand are touching a surface. In the example shown in FIG. 8, user 804 is not touching a surface with his index finger, middle finger, and/or right hand.

Instance 1 shows user 804 with his index finger 806 relatively extended. The relative extension of the index finger can be detected by smart ring 802(1). The relative extension can be interpreted as a first user control input, such as to select an application to run on the smart watch 810.

Instance 2 shows user 804 performing a control input by flexing the index finger 806. This control input can be detected by smart ring 802(1) and distinguished by the smart ring from the control input of Instance 1 by a change in finger pose to a relative flexion of the index finger. This control input could be interpreted as a scroll down control input by the smart watch 810, for example.

Instance 3 shows a control input by user 804 similar to Instance 2 except that it is performed by both the index finger 806 and the middle finger 808 (e.g., a multi-finger gesture) and detected by smart ring 802(1) and smart ring 802(2). This control input could be interpreted as a 'select' control input by the smart watch 810, for example. Mechanisms for accomplishing this functionality are described below relative to FIG. 9.

EXAMPLE SMART RING SYSTEM

Figure 9:
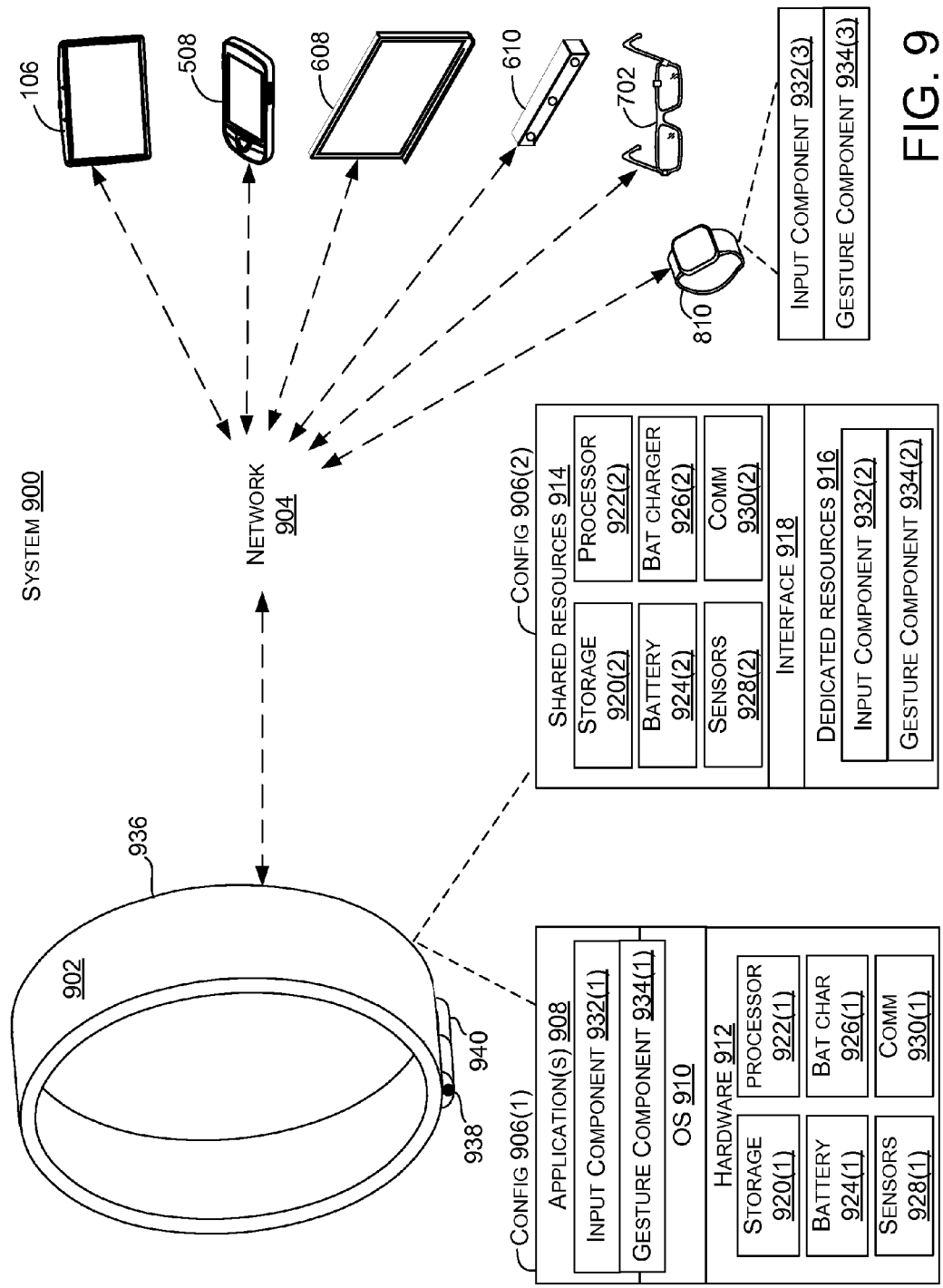
FIG. 9 shows a smart ring system example in accordance with some implementations of the present concepts.

FIG. 9 shows an example smart ring system 900. For purposes of explanation, system 900 includes smart ring 902 (similar to smart rings 102, 502, 602, and/or 802), and multiple example companion devices 106 (e.g., a tablet-type device), 508 (e.g., a smart phone-type device), 608 (e.g., a digital display device), 610 (e.g., a depth sensor), 702 (e.g., smart glasses), and 810 (e.g., smart watch), among others. Any of these devices can communicate over one or more networks 904.

Two configurations 906(1) and 906(2) are illustrated for smart ring 902. Briefly, configuration 906(1) represents an operating system centric configuration and configuration 906(2) represents a system on a chip configuration. Configuration 906(1) is organized into one or more applications 908, operating system 910, and hardware 912. Configuration 906(2) is organized into shared resources 914, dedicated resources 916, and an interface 918 there between.

In either configuration, the smart ring 902 can include storage 920, a processor 922, a battery 924 (or other power source), a battery charger 926, sensors 928, a communication component 930, an input component 932, and/or a gesture component 934. These elements can be positioned in/on or otherwise associated with a physical finger band 936. For instance, the elements can be positioned within the finger band 936 so that the smart ring 902 has the general appearance of a traditional 'jewelry' ring. The finger band 936 can be formed of various materials such as plastics, polymers, and/or natural materials such as jade or other minerals, among other materials. The smart ring 902 can also include ornamental aspects such as precious stones to mimic a traditional jewelry ring.

In some implementations, an instance of input component 932(3) and/or a gesture component 934(3) can be located on the companion device, such as smart watch 810 as shown in FIG. 9. Alternatively or additionally, the input component 932(3) and/or the gesture component 934(3) can be located on any companion device (e.g., devices 106, 508, 608, 610, and/or 702), including multiple devices, and/or on remote cloud based resources (not shown).

From one perspective, any of smart ring 902 and companion device 106, 508, 608, 610, 702, and/or 810 can be thought of as computers.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the computer. The storage can include any one or more of volatile or non-volatile memory, hard drives, flash storage devices, and/or optical storage devices (e.g., CDs, DVDs, etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and/or flash memory, among others.

As mentioned above, configuration 906(2) can be thought of as a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Multiple types of sensors 928 can be included in the smart ring 902. For example, smart ring 902 can include a flexion sensor 938 and a rotation sensor 940. In some implementations, the flexion sensor can sense proximity of the middle portion 218 of the index finger 206 to the smart ring 902 by measuring a distance d (e.g., $d_1$ in Instance 1 and $d_2$ in Instance 2 of FIG. 2). The flexion sensor can produce proximity signals related to the distance d. The flexion sensor can also produce changing proximity signals, such as successively detected signals.

In one example, the flexion sensor 938 can be an infrared proximity sensor for measuring finger flexion and/or extension. In this example, the flexion sensor can consist of an infrared emitter with an LED and a detector. Together, the infrared emitter and the detector can serve as the infrared proximity sensor. For instance, the amount of IR light detected by the detector can relate to the distance between the smart ring 902 and the middle portion of the index finger of the user. In some cases, Lambertian reflectance of skin can be assumed, and light intensity can fall off quadratically with distance (e.g., inverse square law). The distance d can change when the index finger is flexed or extended. In some implementations, the infrared emitter and detector can have a narrow viewing angle (e.g., 6° and 12°, respectively, for example) to prevent spurious reflections from other fingers or an input surface (e.g., surface 214 in FIG. 2). To suppress ambient lighting changes, the distance d can be measured by first registering output from the detector with the LED turned "off," then registering output from the detector with the LED turned "on." The value with the LED "off" can be subtracted from a value with the LED "on" to determine the distance d.

In some implementations, the rotation sensor 940 can produce rotation signals that can give an indication of rotation of the finger. The rotation sensor can also produce changing rotation signals. For example, the rotation sensor can be a 1-axis gyroscope for measuring finger rotation, such as angle $\phi$ as shown in FIG. 3.

In FIG. 9, the flexion sensor 938 and the rotation sensor 940 are shown protruding from the finger band 936, but can be mounted more integral to the finger band. Alternatively or additionally, the flexion sensor and the rotation sensor need not be mounted adjacent to each other. For example, the rotation sensor can be mounted on an opposite side from the flexion sensor (not shown). For instance, the rotation sensor can be disguised as a "jewel" or other ornamentation on the finger band. Additionally or alternatively, ornamentation could include and/or obscure the battery 924 and/or other components.

The input component 932 can receive control input (e.g., signals) from the sensors 928. In some implementations, the input component 932 can identify a finger pose and/or movement from the sensor signals. For example, the input component can use signals from the sensors to identify the relative extension of index finger 206 in Instance 1 of FIG. 2. In this example, the input component may identify the relative extension of the finger with signals from flexion sensor 938. For example, a signal from flexion sensor 938 can correlate to distance $d_1$, indicating the relative extension.

In some implementations, the input component 932 can identify changes in the finger pose using signals from the sensors 928. For example, referring to FIG. 1, the input component can use signals from the sensors to detect a change in the pose of the index finger 108 between Instance 2 and Instance 3. In this case, the input component can identify an extension of the finger using signals from flexion sensor 938, and can identify a rotation of the finger using signals from rotation sensor 940.

Furthermore, in some implementations the input component 932 can define a coordinate system for movement of the fingertip 208, such as described relative to FIG. 3. The input component can communicate the finger pose, pose changes, and/or coordinate system information to the gesture component 934. The gesture component 934 can interpret finger poses and/or changes as movement of a user's fingertip relative to the defined coordinate system. For example, the gesture component can interpret finger pose changes as movements of the fingertip within the x-y plane shown in FIG. 3.

In some implementations, the gesture component 934 can identify a control input gesture associated with the finger pose and/or movement. In some of these cases the gesture component can consider a computing environment of a companion device (e.g., companion device 106) to more accurately identify the control input gesture intended by the user. For example, the gesture component can determine a computing environment of the companion device that the user is interacting with corresponds to a drawing program, internet browser, word processing application, etc. Accordingly, the gesture component can provide different interpretations of finger poses or movements depending on a type of interaction in which the user is engaging. Examples of different interpretations were provided relative to FIG. 1.

To summarize, the input component 932 can receive signals from sensors 928, such as flexion sensor 938 or rotation sensor 940. The input component can determine a finger pose(s) and/or movement from the signals. The finger pose(s) can be communicated to the gesture component 934, which can interpret the finger pose(s)/movement as any of a variety of complex, fine-grained, subtle user control inputs to a companion device. For example, the user can use the smart ring to enter text to a companion device. In some cases, control input can be interpreted by the gesture component as two-dimensional (2D) input. In other cases, control input can be interpreted as three-dimensional (3D) input, or other types of input, such as touch sensing or touch approximation. Further description of smart ring control input is provided below.

Referring again to FIG. 9, the communication component 930 can allow the smart ring 902 to communicate with various devices, such as the illustrated companion devices. The communication component can include a receiver and a transmitter and/or other radio frequency circuitry for communicating with various technologies, such as cellular, Wi-Fi (IEEE 802.xx), Bluetooth (e.g., Bluetooth transmitter), etc.

Note that in some cases the input component 932 on the smart ring 902 can be relatively robust and perform analysis on signals received from sensors 928 to determine a finger pose and/or finger movement. The input component could then send an indication of the determined finger pose and/or movement to the gesture component 934 on the smart ring and/or to a companion device (e.g., any of devices 106, 508, 608, 610, 702, and/or 810) that the smart ring is operating in cooperation with. In other scenarios the input component on the smart ring could send signals and/or other information to a remote resource, such as cloud based resources, for processing.

Similarly, in some cases, the gesture component 934 on the smart ring 902 can be relatively robust and perform analysis on information received from the input component 932 to identify a user control input. For example, the gesture component on the smart ring can direct an action on a companion device (e.g., any of devices 106, 508, 608, 610, 702, and/or 810) based on the identified control input. In other cases, the gesture component, such as gesture component 934(3), can be located on a companion device that the smart ring is operating in cooperation with. In these cases, the input component can send the signals, finger poses, and/or finger movement information to the gesture component 934(3) on the companion device for analysis. The gesture component on the companion device could then analyze the sensor signals, finger pose(s), and/or finger movement information to interpret and/or identify the user control input. Additionally, in some cases the gesture component can also analyze additional signals from sensors on one or more additional smart rings, the companion device, and/or another device to collectively interpret a user control input. In other scenarios the gesture component could send information to a remote resource, such as cloud based resources, for processing.

Some implementations may utilize a calibration procedure to enhance accuracy with individual users. An example calibration procedure for a wrist coordinate system (such as described relative to FIG. 3) can begin with a user resting his/her wrist and a fingertip of an instrumented finger (e.g., a finger wearing a smart ring) on a surface (such as surface 214 in FIG. 2). Note that resting the wrist on a surface may include resting any part of the palm, hand, wrist, or arm on the surface in a manner that allows the user to comfortably pivot (e.g., rotate) at the wrist. In some cases, resting the wrist and fingertip on the surface can prevent fatigue of the arm and/or hand of the user during the interaction. Additionally, in some cases, resting the wrist and fingertip on the surface can limit the variety of hand movements and promote those movements that can be measured with the sensors on the smart ring.

As noted above relative to FIG. 3, the wrist anchor point 304 can be considered a fixed point in space. With the wrist 302 at a relatively fixed location, the fingertip 208 of the instrumented index finger 206 can be moved using two basic movements. The first movement is rotation of the hand 300 at the wrist 302 (correlated to left/right movement, or movement in the x direction as shown in FIG. 3). Rotation of the hand 300 can move the fingertip 208 along arc 306 at radius r. Rotation can change the angle $\phi$. The second movement is flexion/extension of the instrumented index finger 206 (correlated to up/down movement, or movement in the y direction as shown in FIG. 3). Flexing and/or extending the index finger 206 can move the fingertip 208 further from and/or closer to the wrist anchor point 304, which can change radius r. Note that when the fingertip 208 is in line with the wrist anchor point 304 along the y direction, an x value and angle $\phi$ can both be considered zero.

In some implementations, the input component 932 can determine angle $\phi$ by integrating a rotation sensor 940 output $d\phi$ (e.g., rotation rate, delta $\phi$) over time. For example, $d\phi$ can be integrated from a beginning of an interaction, where angle $\phi=0$. In cases where the rotation sensor 940 includes a gyroscope as one of the sensors 928, gyroscope drift may not be corrected, or may be corrected with a magnetometer, such as for longer interactions.

In some implementations, the input component 932 can determine radius r by mapping between the measured distance d (see FIG. 2) and the radius r. In cases where the flexion sensor 938 on the smart ring 902 includes an infrared proximity sensor, the mapping can include accounting for several nonlinear effects. For example, the nonlinear effects can include kinematics of finger flexion/extension movement, IR brightness falloff of the infrared proximity sensor, and nonlinearities in the IR detector of the infrared proximity sensor. In some cases, the calibration procedure can include letting the user move their finger along a set of known radii r, and recording the corresponding distance d values.

In some implementations, the input component 932 can use a linear model to approximate the mapping between distance d and radius r. Additionally or alternatively, angle $\phi$ may be relatively small in practice, such that the input component can use angle $\phi$ to directly approximate linear movement in the x direction. Therefore, in some cases, a model for mapping sensor readings to the wrist coordinate system can be linear: $x=a*\phi$ and $y=b*d-w$. An example calibration of the variables "a" and "b" will be described below.

In some implementations, an initialization sequence performed by the user can be used by the input component 932 to find sensor values that correspond to distance d and angle $\phi$. An example initialization sequence can include tracing a circle in an x-y plane on a surface (such as surface 214 in FIG. 2) with the fingertip 208 three times (or some other unique action). In some cases, tracing the circle can move the fingertip within a comfortable range of motion for the user assuming that the wrist is kept at a fixed location. In these cases, the initialization sequence can include motion within the unit square 308 of the wrist coordinate system shown in FIG. 3. The input component can use the size of the circle to define a physical size of the unit square 308, and also provide the origin 310 (e.g., center of the circle(s)).

In some implementations, while the user is performing the initialization sequence, the input component 932 can record sensor data which can be used to compute the following calibration parameters: $a=0.35/SD(\phi)$, $b=0.35/SD(d)$, and $w=\text{mean}(d)$, where SD is standard deviation. Here, 0.35 is a scale factor ($\approx \frac{1}{2}\sqrt{2}$) that is the inverse SD of a sine wave signal with peak-to-peak amplitude 1. In this example, since the user traces a circle, angle $\phi$ and "b" will be sine waves, therefore the scale factor can map the user's traced circle to the unit square 308 (the physical size) of the wrist coordinate system.

To summarize, the input component 932 can use a linear model for mapping sensor readings to a wrist coordinate system to determine fingertip positions in coordinates x and y. The input component can use sensor signals to determine angle $\phi$ and radius r. The input component can then use angle $\phi$ and radius r to recover the x and y coordinates of a fingertip position. In this manner, the input component can send information to the gesture component 934 for interpretation of a variety of fine-grained, subtle user control inputs in the x-y plane. For example, the gesture component can interpret text input traced by a user with his/her fingertip, pointing with a cursor on a screen of a companion device, or a variety of gestures performed by the user, such as swiping, scrolling, etc. Stated another way, the smart ring 902 can allow an approximation of control input on a touch-enabled surface using any available surface. The surface may have any orientation, and need not be flat.

Note that the user may move his/her fingertip relative to a different axis of rotation, such as shown in FIG. 4. However, although a shift in the location of the rotation axis may change the distance w from the origin to an anchor point of the coordinate system (see FIG. 3), the location shift may not change other modelling assumptions used by the input component 932 for calibrating a coordinate system or recovering fingertip positions in coordinates x and y. For example, a linear mapping model can be used.

Referring again to FIG. 9, in some implementations, the input component 932 can place the smart ring 902 in an inactive sleep state to prevent accidental interpretation of day-to-day user activities as control input and/or gestures. Alternatively or additionally, the smart ring can be placed in an inactive state to conserve energy. For example, the rotation sensor 940 can be in a low-power, autonomous motion-detection state when not in use.

When a user is ready to enter control input on an available surface, the smart ring 902 can be brought into an active state by the input component 932. Stated another way, interaction with the smart ring can be initiated (e.g., triggered), and/or the smart ring can be "unlocked" by the input component. In some implementations, the smart ring may be brought into an active state when the user performs a unique movement with the smart ring. In some cases, the unique movement can be the initialization sequence that may also be used for calibrating the smart ring. For example, the initialization sequence of tracing a circle in an x-y plane three times (or some other unique action) can be interpreted by the input component to both "unlock" the smart ring and calibrate a coordinate system for control input with the smart ring. In this manner, a size range of a unit square of a coordinate system can be adapted to different applications or body poses (which may differ in terms of comfortable motion ranges). Stated another way, the size range of the unit square can change between uses depending on the user's position, and it may be advantageous to re-calibrate the coordinate system of the smart ring to a more appropriate unit square size.

Some smart ring systems can include visual feedback on a companion device (e.g., a cursor) with a screen, or an option for visual feedback use cases. In these systems or use cases, interaction with the smart ring 902 can be "always on" during use with visual feedback. In these cases, a user can move a cursor toward an edge of the screen by moving a finger instrumented with the smart ring in a corresponding direction. In some cases, the user may continue to move their finger in the corresponding direction, such as after the cursor has reached the edge of the screen of the companion device. In some implementations, a cursor position can be clamped (e.g., pinned) at edges of the screen, so that when the user moves the cursor towards a screen edge using the smart ring, any further movement in that direction will drag the wrist coordinates along in space. Viewed from one perspective, a unit square (such as unit square 308 shown in FIG. 3) can be mapped to an area of the screen. When the cursor reaches the edge of the screen, the smart ring system can adjust an alignment of the unit square and/or the screen such that the unit square remains aligned with and/or mapped to the screen. In this manner, the cursor can be prevented from leaving the screen, or becoming "lost." Other methods of maintaining a cursor within a screen view, or accommodating "always on" use of the smart ring with visual feedback are considered.

Further, powering sensors and analyzing sensor data consumes power. The input component 932 can manage the sensors 928, battery 924, processor 922, and/or other components to conserve resources. In other configurations a power management controller (not shown) may manage the components.

In summary, at least some of the present implementations can offer a wearable smart ring that can enable users to enter control input. The smart ring can use finger pose detection to capture user interaction instances.

EXAMPLE METHODS

Figure 10:
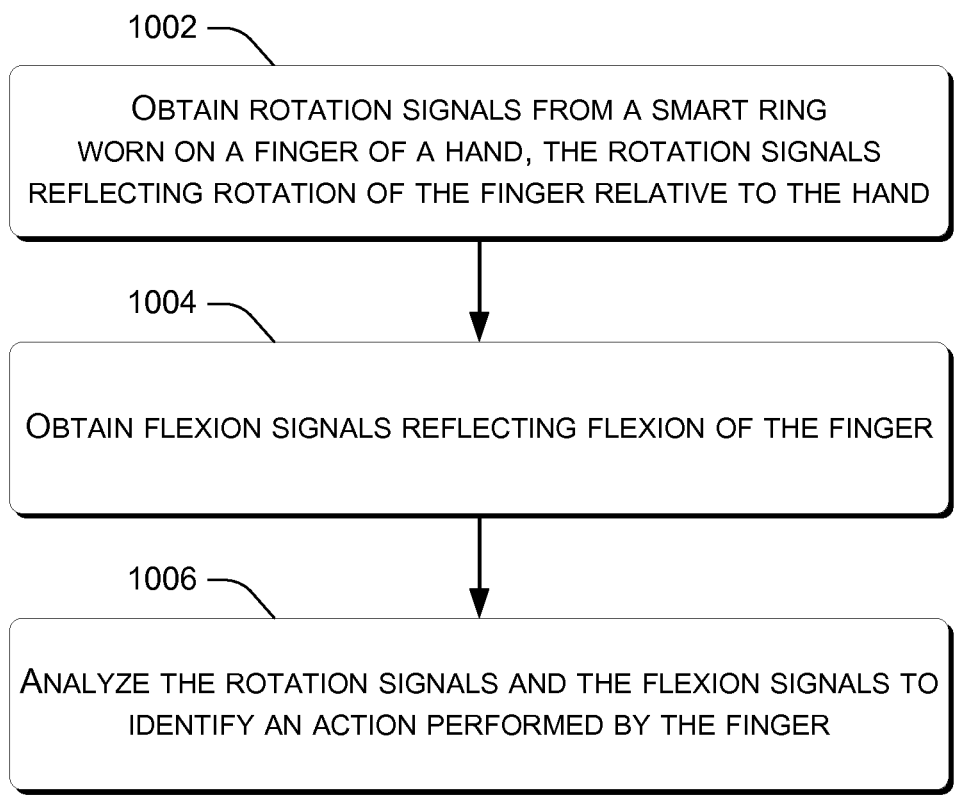
FIG. 10 shows an example flow chart in accordance with some implementations of the present concepts.

FIG. 10 illustrates a flowchart of a technique or method 1000 that is consistent with at least some implementations of the present concepts.

At block 1002, the method 1000 can obtain rotation signals from a smart ring worn on a finger of a hand, the rotation signals reflecting rotation of the finger relative to the hand.

At block 1004, the method 1000 can obtain flexion signals reflecting flexion of the finger.

At block 1006, the method 1000 can analyze the rotation signals and the flexion signals to identify a control input performed by the finger. In some cases, the analysis can include identifying a pose of the finger.

In some cases, the method 1000 can be performed on the smart ring by a processor or microcontroller. In other cases, the signals can be sent from the smart ring to another device, such as a companion device that is proximate to the smart ring and is working cooperatively with the smart ring. The companion device can then perform the interpreting. Some implementations can involve a single user wearing multiple smart rings. In such a case, each smart ring can communicate its signals to the companion device (e.g., with a different ring identifier with the signals). The companion device can then interpret control inputs relating to a single finger or multiple fingers (e.g., multi-finger control input).

In some cases, the smart ring may contain other sensors that sense other parameters. Signals from the other sensors can be interpreted in combination with signals from the flexion sensor and/or the rotation sensor to identify the user control input. In still other cases, sensors on other devices may provide signals that can be utilized in combination with the sensed signals to identify the user control input. Examples of such scenarios are illustrated relative to FIGS. 6-7 where the digital display device 608, the depth sensor 610, and/or the smart glasses 702 may sense the user and provide data that is useful in combination with the flexion and/or rotation data. Also, in some cases, such as a digital whiteboard scenario, multiple users may be performing control inputs and each user may be wearing one or more smart rings.

CONCLUSION

In summary, the present implementations can derive useful information about finger pose from a flexion sensor and/or a rotation sensor on a smart ring worn on a user's finger.

The described methods or processes can be performed by the systems and/or devices described above, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

Although techniques, methods, devices, systems, etc., pertaining to detecting user control inputs are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
   a smart ring configured to be worn on a first segment of a finger of a user;
   at least one flexion sensor secured to the smart ring in a manner that can detect a distance between the at least one flexion sensor and a second segment of the finger; and,
   an input component configured to:
      analyze signals from the at least one flexion sensor to detect an initialization sequence,
      in response to the detected initialization sequence, calibrate a coordinate system of the smart ring, and use the calibrated coordinate system to interpret further signals from the at least one flexion sensor.

2. The system of claim 1, wherein the input component is further configured to cause the smart ring to change from an inactive state to an active state in response to the detected initialization sequence.

3. The system of claim 1, wherein the input component is located on a companion device to the smart ring or wherein the input component is located on the smart ring.

4. The system of claim 1, further comprising a gesture component, the gesture component configured to analyze a pose of the finger and additional signals from at least one other sensor to identify a gesture associated with the pose and the additional signals.

5. The system of claim 1, wherein the input component is further configured to use the detected initialization sequence to calibrate the coordinate system.

6. The system of claim 5, wherein the coordinate system includes a first axis relative to rotational movement of the finger and a second axis relative to flexion and/or extension of the finger, and further wherein the first axis and the second axis pass through a wrist of the user.

7. A smart ring device, comprising:
   a finger band configured to be worn on a first segment of a finger of a user;
   a rotation sensor secured to the finger band in a manner such that the rotation sensor is configured to sense rotation of the finger;
   a proximity sensor secured to the finger band, the proximity sensor configured to sense a distance between the proximity sensor and a second segment of the finger; and,
   a processor and storage storing computer-readable instructions which, when executed by the processor, cause the processor to:
      interpret finger movement sensed by the rotation sensor and the proximity sensor as an initialization sequence, and
      in response to the initialization sequence, calibrate a coordinate system of the smart ring device.

8. The smart ring device of claim 7, wherein the proximity sensor is an infrared proximity sensor for sensing proximity signals related to the distance.

9. The smart ring device of claim 8, wherein the rotation sensor includes a gyroscope for sensing rotation signals related to the rotation.

10. The smart ring device of claim 7, wherein the computer-readable instructions further cause the processor to use the coordinate system of the smart ring device to correlate further finger movement to a pose of the finger.

11. The smart ring device of claim 9, further comprising a communication component configured to communicate the coordinate system, the rotation signals, and the proximity signals to a companion device.

12. The smart ring device of claim 11, wherein the communication component comprises a Bluetooth transmitter.

13. A computer-implemented method, comprising:
   obtaining rotation signals from a smart ring worn on a finger of a hand, the rotation signals reflecting rotation of the finger relative to the hand;
   obtaining flexion signals reflecting flexion of the finger;
   correlating the rotation signals and the flexion signals to positions of a fingertip of the finger;
   determining a computing environment of a companion device of the smart ring; and,
   analyzing the positions of the fingertip and the computing environment to identify a control input performed by the finger, wherein the control input is identified relative to the computing environment of the companion device.

14. The computer-implemented method of claim 13, wherein the analyzing includes interpreting the rotation signals and the flexion signals as changes in a pose of the finger relative to a surface to identify the control input.

15. The computer-implemented method of claim 13, further comprising implementing the control input on the companion device.

16. The computer-implemented method of claim 13, wherein the positions of the fingertip are interpreted as a scroll input when the computing environment is a web browser and wherein the positions of the fingertip are interpreted as a drag input for a different computing environment.

17. The computer-implemented method of claim 13, wherein the obtaining the flexion signals comprises sensing the flexion signals with a flexion sensor on the smart ring or obtaining the flexion signals from the smart ring.

18. The computer-implemented method of claim 17, wherein the flexion signals include a distance from the smart ring worn on a first segment of the finger to a second segment of the finger.

19. The computer-implemented method of claim 13, wherein the obtaining the rotation signals and the obtaining the flexion signals comprise receiving the rotation signals and the flexion signals at the companion device, and wherein the companion device performs the analyzing.

20. The computer-implemented method of claim 19, wherein the companion device comprises a smart phone, a smart watch, smart glasses, a tablet type computer, or a display device.

* * * * *